(12) United States Patent
Bunker et al.

(10) Patent No.: US 10,505,753 B2
(45) Date of Patent: Dec. 10, 2019

(54) IDENTIFICATION GRAPH THEORY

(71) Applicant: Vivint, Inc., Provo, UT (US)

(72) Inventors: Brandon Bunker, Highland, UT (US);
Aaron Davis, Pleasant Grove, UT (US);
Rongbin Lanny Lin, Draper, UT (US);
Shiwei Liu, Lehi, UT (US)

(73) Assignee: Vivint, Inc., Provo, UT (US)

( * ) Notice: Subject to any disclaimer, the term of this patent is extended or adjusted under 35 U.S.C. 154(b) by 0 days.

(21) Appl. No.: 15/952,577

(22) Filed: Apr. 13, 2018

(65) Prior Publication Data

US 2018/0302234 A1 Oct. 18, 2018

Related U.S. Application Data

(63) Continuation of application No. 15/091,326, filed on Apr. 5, 2016, now Pat. No. 9,948,479.

(51) Int. Cl.
*H04L 12/28* (2006.01)

(52) U.S. Cl.
CPC .................. *H04L 12/282* (2013.01)

(58) Field of Classification Search
CPC ........... G06K 9/00; G06F 17/30; G06F 21/32; G06F 21/31; H04L 63/08; H04L 12/282; H04W 12/06; G05B 19/00; B60R 16/037
USPC ............ 340/5.81; 726/17, 19; 382/116, 128; 707/603, 703
See application file for complete search history.

(56) References Cited

U.S. PATENT DOCUMENTS

| | | | |
|---|---|---|---|
| 4,993,068 A | 2/1991 | Piosenka et al. | |
| 5,291,560 A * | 3/1994 | Daugman | A61B 5/1171 382/117 |
| 5,761,329 A * | 6/1998 | Chen | G06K 9/00892 382/116 |
| 6,810,480 B1 | 10/2004 | Parker et al. | |
| 6,950,536 B2 | 9/2005 | Houvener | |
| 7,366,329 B2 * | 4/2008 | Ono | G07C 9/00158 382/115 |
| 7,421,097 B2 * | 9/2008 | Hamza | G06K 9/00288 235/382 |
| 7,555,148 B1 | 6/2009 | Steinberg et al. | |
| 7,864,987 B2 * | 1/2011 | Venkatanna | G06F 21/32 235/380 |
| 7,898,385 B2 * | 3/2011 | Kocher | G07C 9/00087 340/5.52 |
| 7,912,842 B1 | 3/2011 | Bayliss | |
| 7,929,733 B1 | 4/2011 | Lehnert et al. | |

(Continued)

FOREIGN PATENT DOCUMENTS

WO 2015005948 A1 1/2015

OTHER PUBLICATIONS

PCT International Search Report for International Application No. PCT/US2017/026113, dated Jul. 17, 2017 (3 pp.).

*Primary Examiner* — Nam V Nguyen

(74) *Attorney, Agent, or Firm* — Holland & Hart, LLP

(57) ABSTRACT

Apparatuses, techniques, and methods for a security and/or automation system are described. In some cases, these may include detecting a presence of a person at a location; determine a first identification datum associated with the person; calculating a first probability of identification based at least in part on the first identification datum; determining an identity of the person based at least in part on the first probability; and initiating an action based at least in part on the determined identity.

18 Claims, 10 Drawing Sheets

(56) References Cited

U.S. PATENT DOCUMENTS

| | | |
|---|---|---|
| 8,260,740 B2 | 9/2012 | Davis et al. |
| 8,265,341 B2 * | 9/2012 | Dernis ............... G06K 9/00892 |
| | | 379/88.01 |
| 8,600,019 B1 * | 12/2013 | Cooper ............... H04M 3/4936 |
| | | 379/118 |
| 8,659,390 B2 | 2/2014 | Rickman |
| 8,952,781 B2 | 2/2015 | Al-Azem et al. |
| 9,032,510 B2 | 5/2015 | Sampathkumaran et al. |
| 9,082,235 B2 | 7/2015 | Lau et al. |
| 9,189,680 B2 | 11/2015 | Komatsu et al. |
| 9,196,028 B2 | 11/2015 | Rodriguez et al. |
| 9,286,482 B1 * | 3/2016 | Dumont ................ G06F 21/32 |
| 9,323,911 B1 | 4/2016 | Alikhani |
| 9,336,442 B2 | 5/2016 | Cok |
| 9,394,737 B2 * | 7/2016 | Gehin ................ B60R 25/2054 |
| 9,514,752 B2 * | 12/2016 | Sharifi ................ G10L 15/08 |
| 9,519,909 B2 * | 12/2016 | Nielsen ................ H04H 60/45 |
| 9,573,541 B2 | 2/2017 | Graumann et al. |
| 9,665,703 B2 | 5/2017 | Turgeman et al. |
| 9,948,479 B2 * | 4/2018 | Bunker ................ H04L 12/282 |
| 2007/0189585 A1 | 8/2007 | Sukegawa et al. |
| 2013/0182913 A1 | 7/2013 | Hoyos et al. |
| 2014/0085050 A1 | 3/2014 | Luna |
| 2014/0196143 A1 | 7/2014 | Fliderman et al. |
| 2014/0223531 A1 | 8/2014 | Outwater et al. |
| 2014/0314283 A1 | 10/2014 | Harding |
| 2014/0366128 A1 | 12/2014 | Venkateswaran et al. |
| 2015/0123766 A1 | 5/2015 | St. John |
| 2016/0104334 A1 | 4/2016 | Handville et al. |
| 2016/0239649 A1 * | 8/2016 | Zhao .................... G06F 21/316 |

\* cited by examiner

IDENTIFICATION GRAPH THEORY

CROSS-REFERENCE TO RELATED APPLICATIONS

The present application is a continuation of U.S. patent application Ser. No. 15/091,326 filed Apr. 5, 2016, now U.S. Pat. No. 9,948,479, titled "IDENTIFICATION GRAPH THEORY," and assigned to the assignee hereof, the disclosure of which is expressly incorporated herein in its entirety by this reference.

BACKGROUND

The present disclosure, for example, relates to security and/or automation systems, and more particularly using identification graph theory concepts.

Security and automation systems are widely deployed to provide various types of communication and functional features such as monitoring, communication, notification, and/or others. These systems may be capable of supporting communication with a user through a communication connection or a system management action.

Some automated systems may be programmed to enable personalized settings in a room based on a previously stored personal profile or attempting to identify a person. For example, one member of a household may prefer certain settings while another may prefer different settings. In these cases, the household member may select a profile to initiate the settings. However, these inputs require active input and/or may not be correct due to multiple household members using the same identification code or being present at the same time. The following description describes methods and systems for identifying users and initiating preference-based events based on correctly identifying a person.

SUMMARY

Multiple members of a household may have various personal preferences for household events such as light settings, temperature settings, receiving messages from other family members, locking and unlocking doors, security settings and the like. An automated system may enable the settings through commands when the system identifies the associated household user; however, a user may have to actively identify himself or herself before the system can initiate the requested settings or adjustments may be based on inaccurate identifications. The following description provides methods and systems that progressively learn the correct identity of a user based on variable identification methods. In some cases, the probability that a user is correctly identified is adjusted or updated as data is received by one or more devices.

A method for security and/or automation is described. In one embodiment, the method may include detecting a presence of a person at a location, determining a first identification datum associated with the person, calculating a first probability of identification based at least in part on the first identification datum, determining an identity of the person based at least in part on the first probability, and initiating an action based at least in part on the determined identity. In some examples, initiating the action may include broadcasting a notification to the person at the location or a second person at a second location. In some examples, determining the first identification datum may include detecting a behavioral pattern associated with the location and/or detecting an action of the person. In some examples, the second person may include a unknown person. In some further example, the first identification datum may be compared to a user profile stored in memory.

In some examples, determining the first identification may include receiving temporal data related to determining the presence of the person at the location, receiving identifying information from the user, determining a physical characteristic associated with the person, receiving a wireless communication from an electronic device associated with the person, and/or receiving social media information associated with the person. In some examples, the wireless communication may include receiving an indication of an operation performed by the electronic device. In some examples, the user and the person may be different individuals. In some examples, receiving the identifying information may include receiving a personal identification code.

In some examples, the method may include determining a second identification datum associated with the person, based at least in part on the first identification datum, calculating a second probability of identification based at least in part on the first identification datum and the second identification datum, and determining the identity of the person based at least in part on the first probability and the second probability. In some examples, determining the identity of the person may be based at least in part on the first probability satisfying a threshold value.

In some examples, calculating the first probability of identification and calculating the second probability of identification may be performed using computational intelligence. In some examples, using computational intelligence may include calculating the first probability of identification at a first node in a decision tree, and calculating the second probability of identification at a second node in the decision tree, the second node dependent on the first node.

In some examples, calculating the second probability of identification includes analyzing the first identification datum and the second identification datum based at least in part on a user profile stored in memory, and updating the user profile based at least in part on the analysis. In some examples, updating the user profile may be based at least in part on receiving a confirmation of identification or a rejection of identification from the person.

In some examples, determining the identity of the person includes determining a third identification datum associated with the person or a second person, re-calculating the first probability and the second probability based at least on receiving the third identification datum, and calculating a third probability of identification based at least in part on the first probability and the second probability. In some examples, the third identification datum may include a confirmation of identification or a rejection of identification from the person. In some examples, updating the first probability is based at least in part on an adjustment to a user profile.

The foregoing has outlined rather broadly the features and technical advantages of examples according to this disclosure so that the following detailed description may be better understood. Additional features and advantages will be described below. The concepts and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

The systems and methods described herein relate generally to detecting the presence of a person in a location, identifying the person as a user of an automation and/or security system using customized algorithms and decision making, and various identifying inputs. In some examples, the algorithms adjust the confidence level and/or probability that a person determined to be present in a location is a specific individual based on one or more identifying factors. The identifying factors may include physical characteristics, active inputs by a user, identifying electronic devices and/or particular uses of electronic devices associated with a person, information received from third-party sources or determined separately from the individual (e.g., the time, the day of the week), some combination, and other information. In some examples, identifying the person as a user of the system may result in initiating an action based on the identification.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

Figure 1:
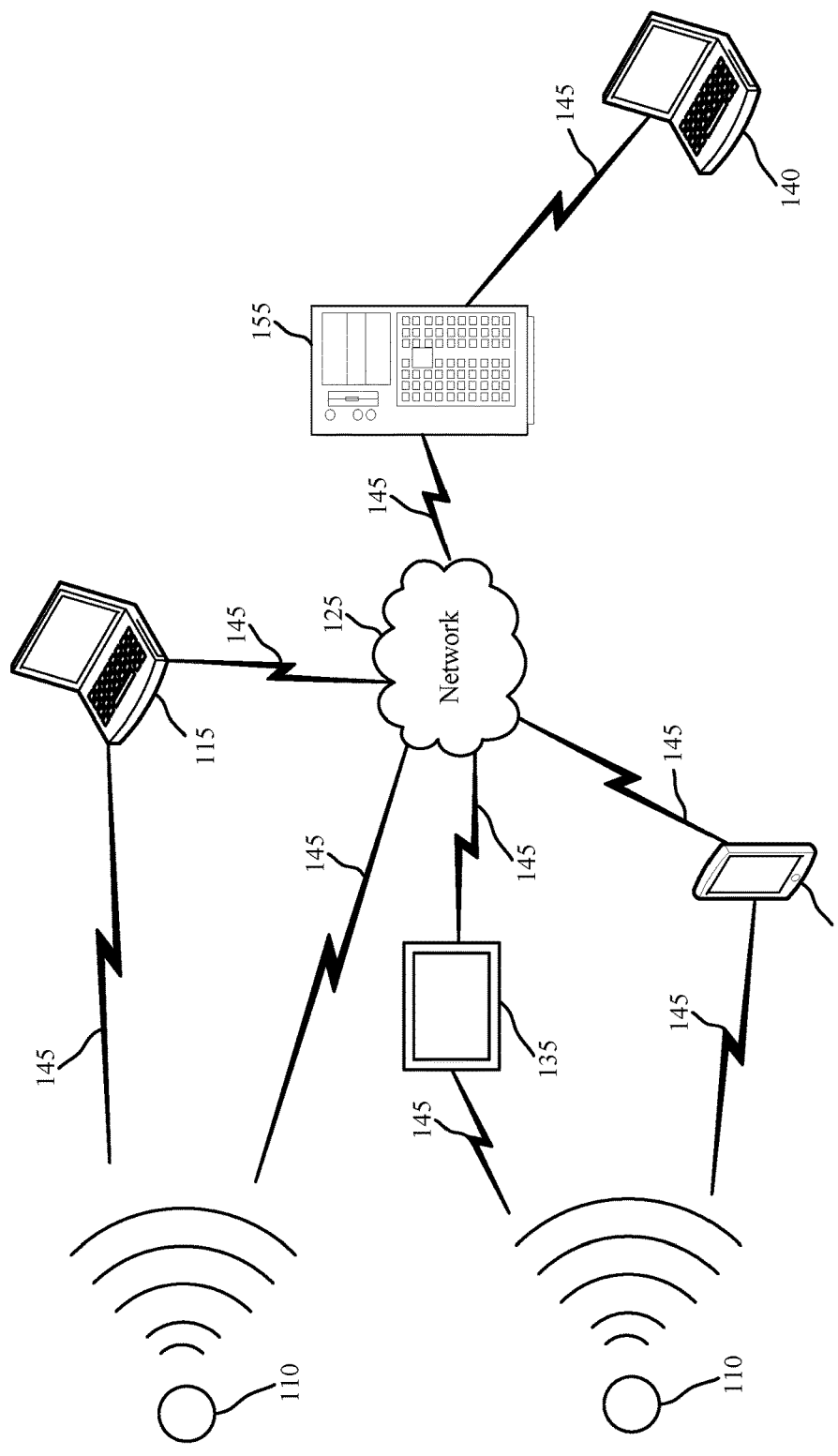
FIG. 1 shows a block diagram of an example of a security and/or automation system in accordance with various aspects of this disclosure.

FIG. 1 is an example of a communications system 100 in accordance with various aspects of the disclosure. In some examples, the communications system 100 may include one or more sensor units 110, local computing devices 115 and 120, network 125, server 155, control panel 135, and remote computing device 140, among other components. One or more sensor units 110 may communicate via wired or wireless communication links 145 with one or more of the local computing devices 115 and 120 or network 125. The network 125 may communicate via wired or wireless communication links 145 with the control panel 135 and the remote computing device 140 via server 155. In alternate examples, the network 125 may be integrated with any one of the local computing devices 115 and 120, server 155, or remote computing device 140, such that separate components are not required.

Local computing devices 115 and 120 and remote computing device 140 may be custom computing entities configured to interact with sensor units 110 via network 125, and in some examples, via server 155. In other examples, computing devices 115 and 120 and remote computing device 140 may be general purpose computing entities such as a personal computing device, for example, a desktop computer, a laptop computer, a netbook, a tablet personal computer (PC), a control panel, an indicator panel, a multi-site dashboard, an iPod®, an iPad®, a smart phone, a smart watch, a fitness tracker, a mobile phone, a personal digital assistant (PDA), and/or any other suitable device operable to send and receive signals, store and retrieve data, and/or execute modules.

Control panel 135 may be a smart home system panel, for example, an interactive panel permanently or removably mounted on a wall in a user's home. Control panel 135 may be in direct communication via wired or wireless communication links 145 with the one or more sensor units 110, or may receive sensor data from the one or more sensor units 110 via local computing devices 115 and 120 and network 125, or may receive data via remote computing device 140, server 155, and network 125.

The local computing devices 115 and 120 may include memory, a processor, an output, a data input and a communication module. The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some examples, the local computing devices 115 and 120 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, receiving and displaying data from sensor units 110.

The processor of the local computing devices 115 and 120 may be operable to control operation of the output of the local computing devices 115 and 120. The output may be a television, a liquid crystal display (LCD) monitor, a cathode ray tube (CRT) monitor, speaker, tactile output device, and/or the like. In some examples, the output may be an integral component of the local computing devices 115 and 120. Similarly stated, the output may be directly coupled to the processor. For example, the output may be the integral display of a tablet and/or smart phone. In some examples, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing devices 115 and 120 to the output.

The remote computing device 140 may be a computing entity operable to enable a remote user to monitor the output of the sensor units 110. The remote computing device 140 may be functionally and/or structurally similar to the local computing devices 115 and 120 and may be operable to receive data streams from and/or send signals to at least one of the sensor units 110 via the network 125. The network 125 may be the Internet, an intranet, a personal area network, a local area network (LAN), a wide area network (WAN), a virtual network, a telecommunications network implemented as a wired network and/or wireless network, etc. The remote computing device 140 may receive and/or send signals over the network 125 via communication links 145 and server 155.

In some examples, the one or more sensor units 110 may be sensors configured to conduct periodic, continuous, or otherwise ongoing automatic measurements related to determining the presence of at least one person in or at a location and/or determining data related to identifying the person determined to be present in the location. Each sensor unit 110 may be capable of sensing multiple identification parameters, or different sensor units 110 may be capable of sensing a specific identification parameter. For example, one sensor unit 110 may measure biometric data, while another sensor unit 110 (or, in some examples, the same sensor unit 110) may detect digital and/or electronic data, a physical characteristic of the person, or a location of a different person. In some examples, one or more sensor units 110 may additionally monitor alternate environmental parameters, such as the date, time, and/or weather. In alternate examples, a user may input identification data directly at the local computing devices 115 and/or 120 or at remote computing device 140. For example, a user may enter a personal identification code into a dedicated application on his smart phone indicating that he has entered the living room.

Data gathered by the one or more sensor units 110 may be received by local computing devices 115 and 120, which may be, in some examples, a thermostat or other wall-mounted input/output smart home display. In other examples, local computing devices 115 and 120 may be a personal computer or smart phone. Where local computing device 115 and/or 120 is a smart phone, the smart phone may have an application for collecting identification data and calculating the probability of identification therefrom. The local computing devices 115 and 120 may process the data received from the one or more sensor units 110 to obtain presence data, identification data, and to determine the probability of determining the identification data indicates a specific person. In alternate examples, remote computing device 140 may process the data received from the one or more sensor units 110, via network 125 and server 155, to obtain identification data and determine the probability. Data transmission may occur via, for example, frequencies appropriate for a personal area network (such as BLUETOOTH® or IR communications) or local or wide area network frequencies such as radio frequencies specified by the IEEE 802.15.4 standard.

In some examples, local computing devices 115 and 120 may communicate with remote computing device 140 or control panel 135 via network 125 and server 155. Examples of networks 125 include cloud networks, local area networks (LAN), wide area networks (WAN), virtual private networks (VPN), wireless networks (using 802.11, for example), and/or cellular networks (using 3G and/or LTE, for example), etc. In some configurations, the network 125 may include the Internet. In some examples, a user may access the functions of local computing devices 115 and/or 120 from remote computing device 140. For example, in some examples, remote computing device 140 may include a mobile application that interfaces with one or more functions of computing devices 115 and/or 120.

The server 155 may be configured to communicate with the sensor units 110, the local computing devices 115 and 120, the remote computing device 140 and control panel 135. The server 155 may perform additional processing on signals received from the sensor units 110 or local computing devices 115 and 120, or may simply forward the received information to the remote computing device 140 and control panel 135.

Server 155 may be a computing device operable to receive data streams (e.g., from sensor units 110 and/or local computing devices 115 and 120 or remote computing device 140), store and/or process data, and/or transmit data and/or data summaries (e.g., to remote computing device 140). For example, server 155 may receive a stream of identification data from any of a number of sensor units 110. In some examples, server 155 may "pull" the data, e.g., by querying the sensor units 110, the local computing devices 115 and 120, and/or the control panel 135. In some examples, the data may be "pushed" from the sensor units 110 and/or the local computing devices 115 and 120 to the server 155. For example, the sensor units 110 and/or the local computing devices 115 and 120 may be configured to transmit data as it is generated by or entered into that device. In some instances, the sensor units 110 and/or the local computing devices 115 and 120 may periodically transmit data (e.g., as a block of data or as one or more data points).

The server 155 may include a database (e.g., in memory) containing identification data received from the sensor units 110 and/or the local computing devices 115 and 120. Additionally, as described in further detail herein, software (e.g., stored in memory) may be executed on a processor of the server 155. Such software (executed on the processor) may be operable to cause the server 155 to monitor, process, summarize, present, and/or send a signal associated with resource usage data.

Figure 2:
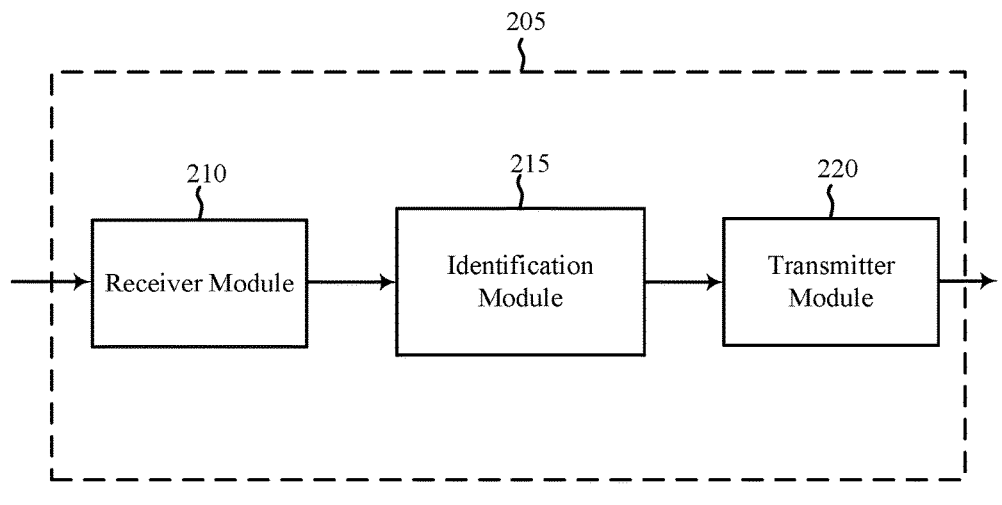
FIG. 2 shows a block diagram of a device relating to a security and/or an automation system, in accordance with various aspects of this disclosure.

FIG. 2 shows a block diagram 200 of an apparatus 205 for use in automation and/or security systems, in accordance with various aspects of this disclosure. The apparatus 205 may be an example of one or more aspects of a control panel 135 described with reference to FIG. 1. In other examples, the apparatus 205 may be an example of one of the computing devices 115, 120, and/or 140. The apparatus 205 may include a receiver module 210, an identification module 215, and/or a transmitter module 220. The apparatus 205 may also be or include a processor. Each of these modules may be in communication with each other—directly and/or indirectly.

The components of the apparatus 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210 may receive information such as packets, user data, and/or control information associated with various information channels (e.g., control channels, data channels). The receiver module 210 may be configured to receive data related to the presence of a person in a location and/or data related to identifying the person at the location Information may be passed on to the identification module 215, and to other components of the apparatus 205.

The transmitter module 220 may transmit the one or more signals received from other components of the apparatus 205. The transmitter module 220 may transmit the presence and/or information data to a remote computer system to determine a probability. In another embodiment, the transmitter module 220 may receive a probability regarding the accuracy of the person identified, and thus may transmit a suggestion or a command to the automation and/or security system in response to the probability determination. In some examples, the transmitter module 220 may be collocated with the receiver module 210 in a transceiver module.

The identification module 215 may receive data related to determining the presence of a person in a location, determining the identification of the person in the location, and/or determining the probability that the person identified is accurately identified, among other things. A person may be identified in a broadest sense by a determining that a person is present in a location, as opposed to the system identifying other movement, other sounds, or other presence detecting features which may not be related to a person, or more specifically, a user of the system. In addition, a person may be identified by determining that the person is a person unknown to the system or a known user to the system based on a user profile or other information. In some examples, a known person may approved, unapproved, and/or has a user profile stored in memory. For example, a person may be an approved user, such as a family member in the household (e.g., father, mother, daughter, son) or a frequent guest (e.g., grandparents, frequent friends, nanny, housekeeper). Each of the approved users may have a user profile stored in the system that may comprise identifying information and/or preferences related to the user. In another example, the person may be known, but may not be considered an approved user. For example, there may be a user profile stored, or the system may otherwise have information related to, a guest that is not welcome in the home at all, at specific times, or when certain conditions exist or are present (e.g., parent is gone), such as a previous employee, neighbor, friend, or someone that was granted temporary access. In other examples, the known but unapproved user may be someone the system is enabled to identify from third-party sources (e.g., news reports, social media, user contacts, emergency alerts), but is not approved to be in the home. An unknown person may be a person that has not yet been identified, or for various reasons, cannot be identified, but for whom data may exist (e.g., a non-identifiable person).

In addition to detecting the presence of a person, the system is enabled to determine the specific identity of the user. For purposes of clarity, a "person" may be considered a human that is determined to be present in a location and/or a person incapable of being identified, whereas a "user" may be considered a human that is identified as being an identifiable human, regardless if the user is approved or unapproved.

The identity of the person may be determined by what the user physically possesses (e.g., a personal, portable electronic device), what the user knows (e.g., a personal identification number), what the user does (e.g., walks with a specific gait), and/or what the user is (e.g., approved user, mother, child, guest), among other possibilities. In some examples, users of the system may each have an associated user profile stored in memory, where the user profile is populated with data related to the identity of a user. In some cases, the user profile may store data related to a person that does not change; however, in other cases the system may be updated with associated data on a real-time basis or at pre-determined intervals. For example, a file storing a recording of a user's voice, where the user is a child, may be stored; but, as the child grows older, the pitch and/or the tone of his voice may change, and thus the system may be updated. In another example, schedules may be stored, so that schedule-related data (e.g., GPS data, timing data) may be used to aid identification, but the schedules may change over time. Other data may be stored that does not change, such as fingerprints and retinal or iris patterns.

In some examples, each datum related to the identity of a person may be given a specific weight value (or confidence) value, which may be used to calculate a probability that the person detected is a specific user. Each datum may be analyzed alone or with respect to other data received to determine and/or update the determination that a person is a specific user.

Figure 3:
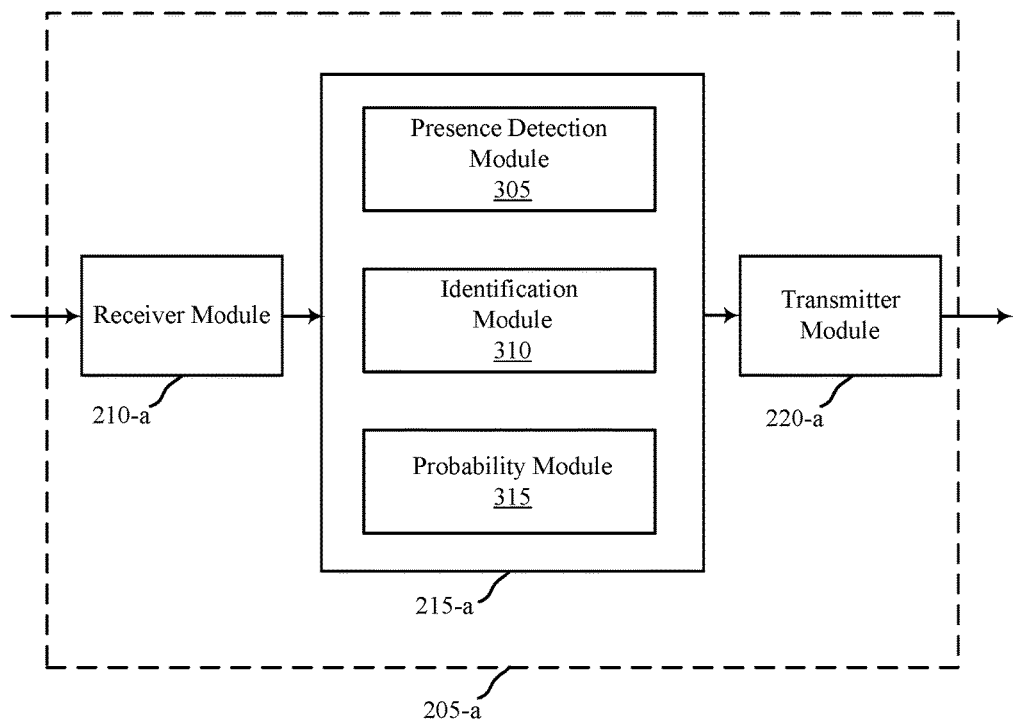
FIG. 3 shows a block diagram of a device relating to a security and/or an automation system, in accordance with various aspects of this disclosure.

FIG. 3 shows a block diagram 300 of an apparatus 205-*a* for use in automation and/or security systems, in accordance with various examples. The apparatus 205-*a* may be an example of one or more aspects of a control panel 135 described with reference to FIG. 1 and/or the apparatus 205 described with reference to FIG. 2. In other examples, the apparatus 205-*a* may be one of the computing devices 115, 120, and/or 140 described with reference to FIG. 1. The apparatus 205-*a* may include a receiver module 210-*a*, an identification module 215-*a*, and/or a transmitter module 220-*a*, which may be examples of the corresponding modules of apparatus 205. The apparatus 205-*a* may also include a processor. Each of these components may be in communication with each other.

The components of the apparatus 205-*a* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

Apparatus 205-*a* may also include components for bi-directional voice and data communications including components for transmitting communications and components for receiving communications. For example, apparatus 205-*a* may communicate bi-directionally with one or more of local computing devices 115 and/or 120, one or more sensor units 110, remote computing device 140, and/or remote server 155, which may be an example of the remote server of FIG. 1. This bi-directional communication may be direct (e.g., apparatus 205-*a* communicating directly with remote server 155) or indirect (e.g., apparatus 205-*a* communicating indirectly with remote server 155 through control panel 135).

The identification module 215-*a* may include a presence detection module 305, an identification module 310, and/or a probability module 315, among others. The receiver module 210-*a* and the transmitter module 220-*a* may perform the functions of the receiver module 210 and the transmitter module 220 of FIG. 2, respectively.

The presence detection module 305 may be enabled to detect a person in a location. In some examples, the presence detection module may be able to differentiate between a person and other data (e.g., movement). In one embodiment, image capture may be used to determine the presence of a person. For example, an image capture device, such as a camera, may be positioned to capture pictures and videos in a location, may detect motion occurring within a predetermined distance from the image capture device. Presence may also be detected through sound captured at a microphone or other sound capture device. In other examples, presence may be determined by way of pressure detection (e.g., pressure sensitive floors), infrared detection, temperature differences, vibration detection, etc. In one example, the detection of movement, sound, vibrations, etc. may be caused by a person or may be caused by a vehicle approaching the residence. In other examples, the motion may be caused by factors such as animals or tree branches blowing in the wind; however, the presence detection module may be enabled to differentiate environmental types of motion from motion specific to the location. For example, the system may receive data on the estimated, calculated, or determined height, speed, and/or gait of an object moving outside and determine that the object is likely an animal (e.g., dog, deer). If the object moving is smaller and faster than what the system knows to be a person or a dog, the system may determine it is likely a squirrel or a cat. In other examples, the system may determine that the movement is a tree moving in the wind by querying previous determinations and determining the movement is occurring in the same frame of reference, during a time, during a time period, or based on a frequency in the same way (e.g., swaying back and forth within a 10 foot span).

The identification module 310 may determine at least one datum associated with determining the identity of the person once the presence of the person is detected by the presence detection module 305. In some examples, the system may determine that the person is a user of the system (e.g., household member, guest, expected visitor), that the person is not a user of the system, or that the person is unidentifiable. Identification data may be related to a person's biology and/or anatomy, to information a user knows, actions, interactions with devices or areas or locations, environmental and temporal data, electronic data and information received from devices associated with a user, situational data, and the like. Identification data is further described with respect to FIG. 4.

The probability module 315 may determine a probability and/or confidence level that a person is a specific user based on at least one identification data determined by the identification module 310. In some examples, the probability module 315 may calculate a probability based on any computational-based or comparison-based algorithms such as, but not limited to, graph theory, neural networks, Bayesian modeling, machine learning/artificial intelligence, and the like.

In one embodiment, the probability module 315 may compare and/or analyze data received from the identification module 310 to determine a probability or update a probability of identification. In some examples, the probability module 315 may compare the data received to a database of previously known data in a user profile and/or may use third-party sources to determine a probability. Probability may be determined based on a single user's identification data and/or in conjunction with data associated with another user or other non-users. Determining an initial probability of identification of a user, as well as updating a probability of identification of the user is further described with respect to FIG. 5

Figure 4:
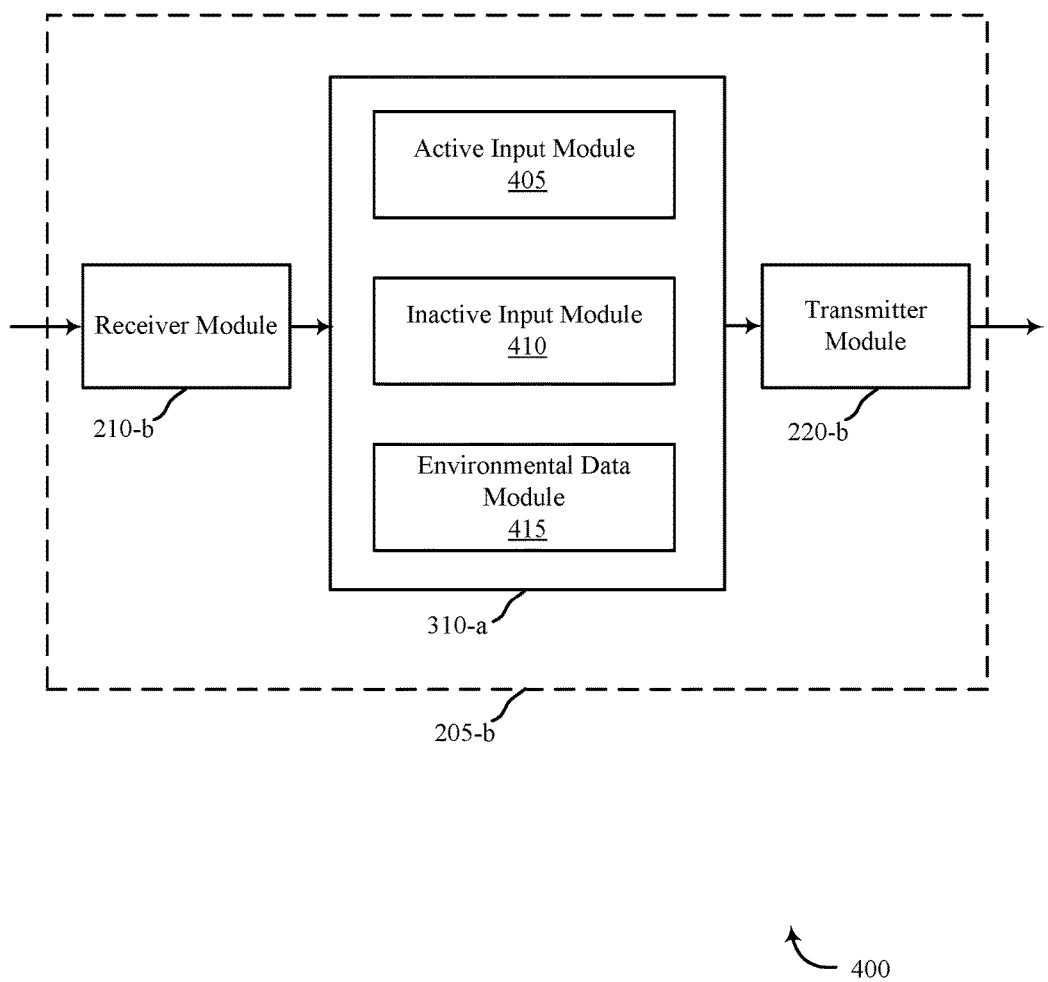
FIG. 4 shows a block diagram relating to a security and/or an automation system, in accordance with various aspects of this disclosure.

FIG. 4 shows a block diagram 400 of an apparatus 205-*b* for use in automation and/or security systems, in accordance with various examples. The apparatus 205-*b* may be an example of one or more aspects of a control panel 135 described with reference to FIG. 1 and/or the apparatus 205 described with reference to FIG. 2 and/or the apparatus 205-*a* described with reference to FIG. 3. In other examples, the apparatus 205-*b* may be an example of one of the computing devices 115, 120, and/or 140 described with reference to FIG. 1. The apparatus 205-*b* may include a receiver module 210-*b*, an identification module 310-*a*, and/or a transmitter module 220-*b*, which may be examples of the corresponding modules of apparatus 205 and/or 205-*a*. The apparatus 205-*a* may also include a processor. Each of these components may be in communication with each other.

The components of the apparatus 205-*b* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

Apparatus 205-*b* may also include components for bi-directional voice and data communications including components for transmitting communications and components for receiving communications. For example, apparatus 205-*b* may communicate bi-directionally with one or more of local computing devices 115 and/or 120, one or more sensor units 110, remote computing device 140, and/or remote server 155, which may be an example of the remote server of FIG. 1. This bi-directional communication may be direct (e.g., apparatus 205-*b* communicating directly with remote server 155) or indirect (e.g., apparatus 205-*b* communicating indirectly with remote server 155 through control panel 135).

The identification module 310-*a* may include an active input module 405, an inactive input module 410, and/or an environmental data module 415, among others. The receiver module 210-*b* and the transmitter module 220-*b* may perform the functions of the receiver module 210 and the transmitter module 220 of FIG. 2, respectively and/or the functions of the receiver module 210-*a* and the transmitter module 220-*a* of FIG. 3, respectively.

The active input module 405 may determine and/or receive identification data from a person actively providing identification data into apparatus 205-*b*. In one embodiment, active input may include biometric data such as the person having his fingerprint and/or retina and/or iris scanned. Other biometric data may be input by way of a voice sample spoken into a microphone and/or positioning oneself to have one's face scanned for facial recognition. In another embodiment, active input module 405 may receive a password or a personal identification code entered using an input device such as a keyboard, touchscreen, number pad, etc. In yet another embodiment, active identification data may be provided by a response (e.g., user input, answering a question) or an interaction with apparatus 205-*b*. For example, if apparatus 205-*b* is a touchscreen control panel coupled to a location in the home, the control panel may present (by audio and/or visual display) a question asking a person detected in the location if the person is the father. If the person is the father, the father may indicate yes by speaking "yes," and/or by selecting an option on the screen or keying in an option or by other input means. In another embodiment, active input module 405 may receive and/or determine identification data by way of a user "checking-in." For example, the user may use the apparatus to indicate that he has arrived at home, or may interact with a software application executing on a personal wireless device to indicate that he is located in the house, at a restaurant, at a work location, or another location.

In some examples, active input module 405 may also receive confirmation input regarding identification, which the system may use to refine and correct the algorithms used to determine probability and correctly identify the user. For example, based on a plurality of received inputs, the system may determine the probability that the user is the mother. The control panel may display or otherwise broadcast or taken an action that is a result of determining the mother's identification. If the user identified is actually the mother, she may input into the system a confirmation that she is correctly identified. Thus, the system may increase its confidence level regarding the probability based on the received identification data. In another example, however, the system may identify the user as the mother, but in fact the user is the daughter. Thus, in this scenario, the daughter can input into the system that the identification was incorrect. The daughter may also input into the system that she is the daughter, enabling the system to learn and adjust the probabilities of identification.

The system may adjust the confidence level of determining the probability of identification over time. In some examples, the confidence level may change, be adjusted, and/or be modified based on additional data received, determinations, calculations, etc. In other examples, the confidence level may change, be adjusted, and/or be modified (e.g., increase) based on a lack of confirmation and/or input from users, which may indicate the accuracy of the system.

In some examples, the system may adjust one or more confidence levels based on user input (e.g., verification). For example, the system may make a determination of identification and then ask the user for confirmation and/or the system may query a user about a specific piece of data in order to assign the data to a specific user. For example, the system may ask: "today a person was determined to be in the kitchen at 5:46 p.m.—was this the father, the mother, the daughter, the son, or other?" In some examples, this query may occur concurrently with the received data, after the data has been received, during when a determination is being made, and/or after a determination has been made. In another example, the system may ask: "today a person visited the website 'ESPN.com' on a smartphone was this the father, the mother, the daughter, the son, or other?"

In some examples, the system may have a safeguard in place to prevent a person from incorrectly (either on purpose or inadvertently) confirming an identification or assigning data to a specific person. For example, specific users may have permission to provide confirmation and may be required to enter a passcode when providing confirmation information.

The inactive input module 410 may determine and/or receive identification data without any active or/or intentional input as described with respect to active input module 405. Inactive data may be data that the apparatus 205-*b* determines and/or receives automatically upon determining the presence of a person. The data may be biometric and/or anatomical data, data associated with and/or received from an electronic device associated with a person, and/or location data.

Biometric and/or anatomical data may include fingerprint and/or retinal/iris data as described with respect to the active input module 405; however, in the case of the inactive input module 410, the biometric data may be retrieved without the person specifically actively providing the data or having an intention to provide this data—based on passive data capturing and recording. For example, fingerprints may be read upon a person touching a doorknob or a retinal scan may be enabled when a camera captures a video of a person entering the home or a room/section of the home. Other inactive input may be received through sensors and may include determining voice biometrics, person's gait, the cadence of a person's steps, a facial scan, determining height, weight, body shape and size, hair length, hair color, hair style, clothing style, and the like.

Known users (which may be approved or unapproved) may have an established user profile which contains the identifying biometric and/or anatomical data associated with the person. The profile may include images, sound files, text data, etc. and may be updated in real-time and/or at predetermined intervals and/or at the user's request and/or at the system's request.

In some examples, inactive input module 410 may determine data related to the number of people in a location. For example, if a microphone detects only one voice, the inactive input module 410 may determine there is only one person present and a probability may be assigned to that data element. However, in some cases, only one voice may be heard, but two people may be present: the mother and a child. Thus, the probability may be based on hearing only one voice, and thus believing there is only one person present, when there are two people present. In another example, if a sensor determines there are two people present, the system may assign a probability of identification based on two people being present. For example, if two people are present, the system may determine that there is a low likelihood that both of the people are the children, since the children are not likely to be home alone or based on a time of day, activities in one or more parts of the home (e.g., presence in a master bedroom or office, interaction with one or more appliances, location or pattern of movement throughout the home). Thus, the system may determine that it is either one adult and one child or two adults, and thus may adjust the probability of identification accordingly.

Inactive input module 410 may determine and/or receive identification data from an electronic device associated with the user. For example, a user may be associated with a portable electronic device such as a tablet, a smartphone, a smartwatch, a fitness tracker, or other device. In one embodiment, inactive input module 410 may receive identification data from an electronic device by way of receiving an electronic signal and/or wireless communication. For example, a user may have a software application on a smartphone, where the software application maintains a history log of keystrokes, websites visited and time accessed, applications executed and time accessed, received and dialed phone calls, text message information, and the like. For example, inactive input module 410 may determine the user is accessing a local news website on her phone. Based on a user profile, learned data, and/or other inputs and/or other data, the system may determine the probability the user is the mother is 90% because the mother is the only person in the household that has previously visited the local news website.

In some examples, the inactive input module 410 may obtain data from social media alone and/or in combination with other data related to presence detection and identification. Social media posts may be identified and then used to modify, change, and/or reassess a probability and/or a confidence level related to one or more identifications. In other examples, the system may use social media posts to assess a probability and/or a confidence level, and then may use sensor data to modify, change, and/or reassess a probability and/or a confidence level.

In some examples, social media post information used in presence detection and/or identification may include: words, phrases, hashtags, punctuation emoticons (i.e., =), :), ;), etc.), graphical emoticons, connections of other social media members, photos, time stamps, global positioning system (GPS) data, and/or combinations of the above, among others. For example, the daughter may post "at soccer practice" on a social media site while at the soccer field. The system may use the post as a first data point in determining that the daughter is not located at home. The system may further obtain location information associated with the post (e.g., GPS) to identify where "soccer practice" is and may make determinations and/or take other actions based on this information. This determination may be in response to and/or based on a current identification being performed or may be distinct and related to past identifications or other actions.

The system may use an application programming interface (API) to receive the social media data and/or some other means of receiving data. The system may ask the user for permission to access the social media data (through an app, an email, a text, and/or a notification, etc.) and/or may use publicly available information without requesting access. The information may be transmitted between servers, using a security system panel, and/or from a phone to a local storage device, etc.

In some examples, one or more social media posts may be used to trigger sensor monitoring in order to determine presence and/or identification. For example, the daughter may post "finally home," or "heading home," and the system may be triggered to perform certain monitoring and/or additional monitoring. For example, the system may analyze information in the post to determine whether or not the daughter is actually located at home. The system may parse the text in the post to interpret the meaning and/or detect keywords such as "home," "holiday," "away," "vacation," etc. The system may detect location information in the post such as a GPS tag or other location-related data (e.g., restaurant activity, actions, locations, events, times).

Additionally, or alternatively, the system may analyze one or more images in the post. The system may perform facial recognition to identify one or more people in the image. In some cases, the system may perform object recognition to identify a setting such as indoors or outdoors, identify an object such as a piece of furniture in the premises (e.g., a lamp, nightstand, headboard, desk, chair, oven, couch), and/or identify a landmark such as the Golden Gate bridge, Lincoln memorial, etc. The system may identify a hashtag (e.g., #feeling sick) and/or emoticon (e.g., ☺, ☹) in the post to further assist interpreting a meaning of the post. The system may compare image information with images stored in a database, such as images of approved and/or expected users in the home, furniture and/or decorations in the home, pets, etc., in order to make a determine as to whether the specific person posting the image (with or without associated alphanumeric posting) is located in the home or where in the home the person may be located, and a related or an independent identification.

In some examples, the present systems and methods may not only use the social media posts of the daughter, but may also use information related to other people. For example, if the daughter is connected to the mother on a social network, the system may examine the mother's accessible social media posts in order to assess information about the daughter. For example, if the mother posts "at Abigail's soccer game" the system may use the post to determine that the daughter (e.g., Abigail) and the mother are not at home. Based on this determination, the system may change a probability and/or a confidence level related to detecting the presence of and/or identification of a person located in the home based at least in part on the mother's social media information. In some cases, the system may assign a weight to the mother and/or the daughter based on a determined probability of interaction between the mother and/or the daughter. For example, the system may determine that the mother has a 80% likelihood of being with the daughter during soccer practice. In some embodiments, this likelihood may be based on past identifications, past system determinations or actions at certain time, determinations related to similar activities (e.g., other sport activities, other child-related activities), similar times of day or week or year (e.g., between 3-6 p.m., after 8 p.m.), based on others that may not be with the child or are known to be in a different location (and absent from being with the child, such as a father or a mother at work), queries being performed at a home or a location during the practice, or other information.

The environmental data module 415 may determine and/or receive data related to the time of day, the date, the weather, the location, the temperature, characteristics of a home or a location (e.g., door locked, appliances in use, lights in certain stat, ambient light, noises detected inside or outside a home or a lack thereof, etc. The environmental data may be used as at least one additional element the probability module may use in determining the probability a person is a specific individual and a related identification. For example, the system may know and/or learn that the daughter is at tennis on Tuesdays between 6:00 p.m. and 8:00 p.m.

This determination may be based on the fact that the daughter's cellular device is recognized (e.g., by way of GPS location data) as being at a tennis court every Tuesday. Thus, the identification module 310-*a* may determine that a person determined to be located in the home is not the daughter based on the environmental data module 415 providing information that it is Tuesday at 7:15 p.m. One or more identifications may be based on compound determinations accounting for multiple factors (e.g., time and location, day and time).

In another example, the environmental data module 415 may provide information regarding a holiday. For example, the household may be comprise of four family members that are approved users (e.g., father, mother, daughter, son); however, the family has indicated on a user profiles or on a system profile, that on Easter, a visitor (e.g., grandmother, grandfather, aunt) comes to the house. The date of Easter varies from year to year, and thus the environmental data module 415 may provide information to the system that Easter is today, and thus calculating the probability that an person is a specific user may be enabled in a different manner on or around the Easter holiday or another abnormal event or time.

In some examples, the presence detection module 305, identification module 310, and the probability module 315 may work together to determine the social interaction and schedule of users. As the system receives more data (i.e., active input, inactive input, environmental, third-party, social media, etc.), the system may determine presence and identification based on expected user interaction and scheduling, including determining and/or correlating patterns and/or trends that occur for one or more users or a for a home itself. In some examples, these patterns and correlations may be based on sensor information, user input, data received and/or analyzed over time or at a single time, persons related to or within a structure at one or more times or at certain times or on certain days, etc. For example, the system may determine over time that the daughter is not present at the house from 8:00 a.m. until 6:00 p.m., Monday through Friday, but also receives overlapping data from a device which shows the daughter is within proximity of a school. Thus, the system may determine the daughter is at school. The system may also determine that between 8:00 a.m. and 8:30 a.m. and also between 5:30 p.m. and 6:30 p.m., the father is not home and his smart device is detected as being within a pre-determined proximity of the daughter's school. The system may therefore make a scheduling determination that the father drops off and picks up the daughter from school as an eco-system specific determination. Based on this information, the system may adjust a confidence value of the probability determination when a person is detected at the home, including those relating to the father, the daughter, or others.

If there is an unexpected anomaly based on a learned schedule and household patterns, the system may send an alert to one of the users which indicates a change or that such an anomaly exists. For example, if a child arrives home from school each weekday between 3:30 and 4 p.m., but then is not home by 5 p.m. a parent or a sibling may be immediately notified.

Figure 5:
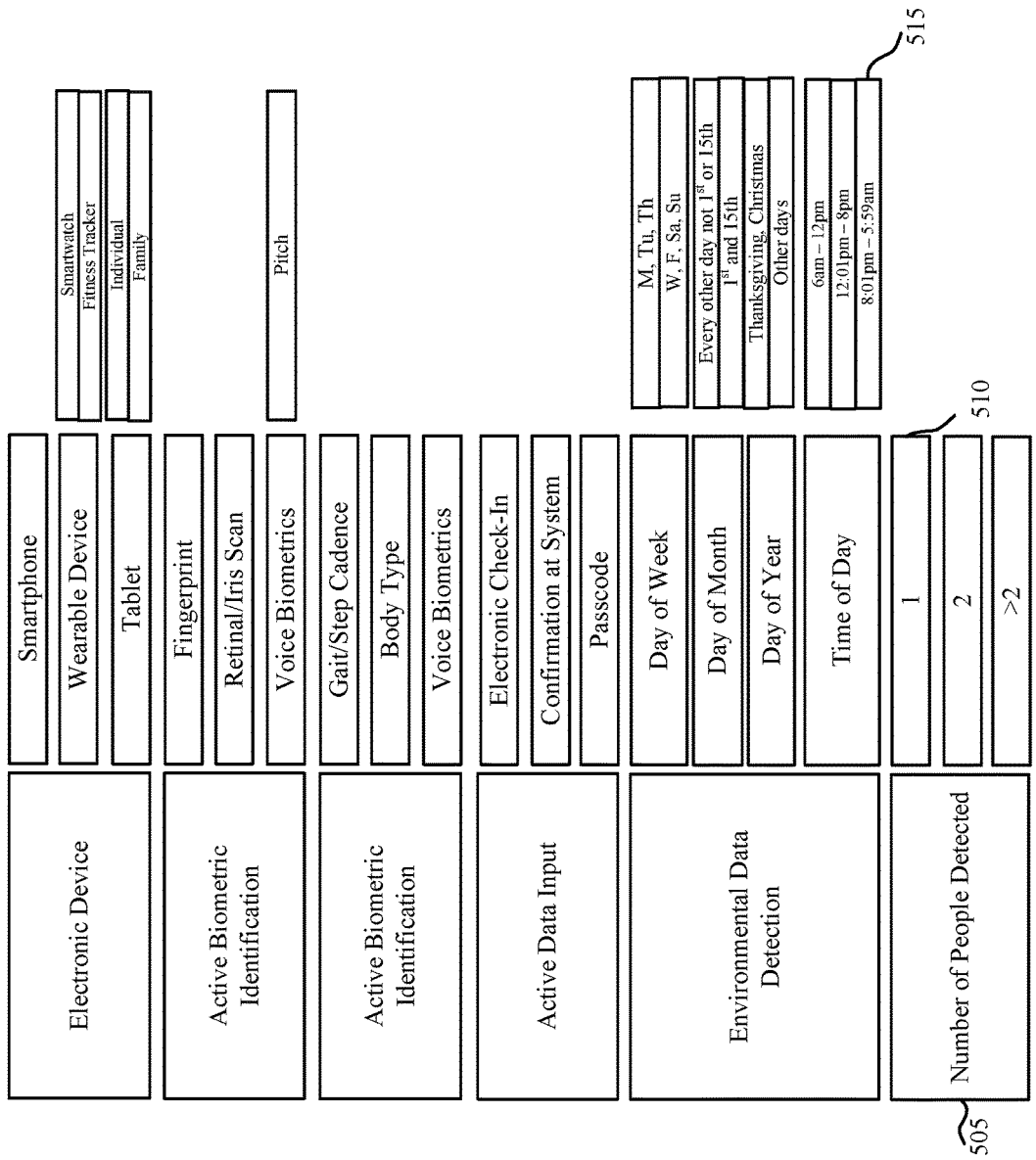
FIG. 5 shows a block diagram of a plurality of identification data, in accordance with various aspects of this disclosure.

FIG. 5 shows a plurality of example identification data and/or identification data categories associated with a plurality of users. In one embodiment, as additional data is determined from each of the columns moving from left to right (column 505 to 515), the probability that a person determined to be located in a specific location is a specifically-identified user may be further refined. Probability may be determined by probability module 315 of FIG. 3. FIG. 5 is one visual example of how data may be received and filtered to determine a probability of identification; however, determining a probability of identification may be enabled by way of computer learning algorithms, artificial intelligence, Bayesian networks, graph theory models, and the like.

Column 505 may represent a first identification datum; for example, identifying one of the following associated with a person determined to be in a location: determining the presence of an electronic device, receiving active biometric identification, receiving inactive biometric identification, receiving active non-biometric identification, detecting environmental data, and/or detecting a number of people in the location. In some examples, the location in which the person is detected may be an additionally considered datum (e.g., a majority of the time, only the mother and the father are in the master bedroom).

In one embodiment, column 505 may represent a broad category of data. For example, the system may detect an identification datum indicative of the presence of an electronic device. However, three of the four family members may each have his or her own electronic device (e.g., smartphone) and one electronic device may be shared by the family (e.g., tablet). Thus, upon detecting the presence of an electronic device, the probability that a person detected in the location is a specific user may be a first value (e.g., 25%). The system may then receive, determine, or otherwise obtain more data. Alternatively, by detecting which device is present and knowing or determining that the device is associated with a user (e.g., a father) or is not associated with one or more other users at certain amount of time based on the probability, the probability that a person detected in the location is a specific user may be a second value that is higher than the first value.

Column 510 represents an example second identification datum, thus providing additional data from which the probability may be refined and/or updated. For example, once an electronic device is detected, the system may then detect what kind of electronic device: a smartphone, a tablet, or a wearable electronic device. Determination of the type of electronic device may be enabled by way of identification a media access control (MAC) address, a IMEI identifier, a wireless communication from a software application executing on the device, and the like. Thus, the system may determine the device recognized is a smartphone and there are only three smartphones in the house, one owned by the daughter and one each for the parents. Thus, the probability may increase to 33% based on this determination.

Each category and data element may be given a weight value used to determine probability of identification. In some cases, the weight values may be user assigned. In other cases, the system may adapt and adjust the weight values based on the accuracy or inaccuracy of identifications over time and the inclusion or exclusion of other data elements. For example, the fact that a smartphone has been detected may be given a weight value and each person assigned a 33% probability of identification; however, the weight value may be lower than the weight value assigned to a data element in the inactive biometric identification category because anyone in the household could pick up a smartphone. In contrast, it is unlikely everyone in the same household has the same gait or step cadence. Thus, a first category or datum may be weighed differently than a second category or datum, based at least in part on the type or the method of receiving the category or datum.

In another embodiment, the person in the location may actively provide a biometric identifying datum to the system through, for example, a fingerprint scan, a retinal scan, and/or voice biometrics. In the case of a fingerprint scan or a retinal scan, the system may have a definitive determination as to identification due to the uniqueness of the datum; however, the data may still be considered overall in making the current probability determination or a future probability determination and related identification (whether such a unique identifier is present or not). Furthermore, in other examples, the system may use the combination of unique identifiers with other identifiers to refine the probability of the identity of a specific person in later dates when a fingerprint scan or retinal scan is not taken.

Column 515 represents an example third identification datum, thus providing additional data from which the probability may be refined, adjusted, modified, and/or updated. Columns 505, 510, and 515 are examples of three identification data; however, the system is not limited to only three data elements, and the probability determination may not be linearly-based, as shown in FIG. 5. In some examples, the probability determination may be flow-based, multi-factor-based, include a web of interconnected and/or varying nodes, some combination, or be based on other constructions.

Figure 6:
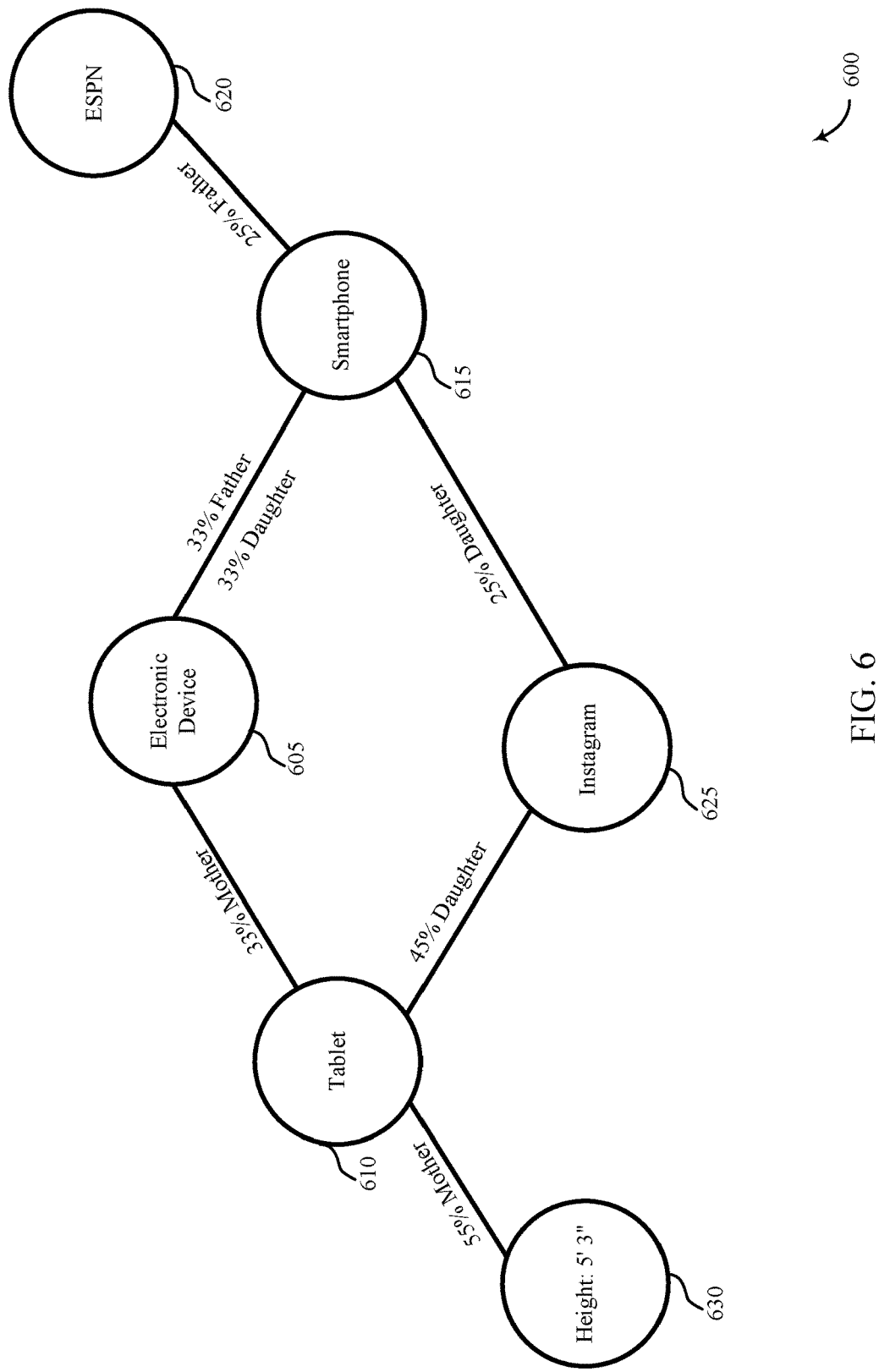
FIG. 6 shows a probability graph relating to a security and/or an automation system, in accordance with various aspects of this disclosure.

FIG. 6 shows a probability graph 600 relating to a security and/or an automation system, in accordance with various aspects of this disclosure. More specifically, FIG. 6 shows an example of graph theory and related determinations and identifications; however, other machine learning, algorithms, probabilistic models, and computational methods may be considered when determining the probability of identification.

FIG. 6 shows a plurality of data nodes 605, 610, 615, 620, 625, and 630. Each data node is linked by lines or edges which indicate a probability determination made with the addition of each data node. For example, the system may first make a determination at a first node (e.g., node 605) that an electronic device is in the location. Based on that determination, the system may calculate a 33% probability that the user is the mother, a 33% probability that the user is the daughter, and a 33% probability that the user is the father. The system or a device may receive or analyze other data at a second node (e.g., node 610). Node 610 determines that the electronic device is a tablet, and thus there is actually a 55% probability the user is the mother and a 45% probability the user is the daughter, since the tablet is a shared device by these individuals. In some embodiments, each of these probabilities may be based on the same data (e.g., amount of time user, frequency of use, time and/or day of use, or time and/or day of determination). The next data node 630 taken into consideration may be a determination of a person's actual or relative characteristic from one or more sources (e.g., a sensor, an electronic device)—such as a person's height (e.g., 5' 3" in FIG. 6, under 5', under 4'), which may increase the probability to 95% that the user is the mother, as the mother is 5'3" and the daughter is 4' 4". In another example, the system may determine by way of data node 625 that the user in possession of the tablet is accessing the software application INSTAGRAM™. Because the system has learned that the daughter frequents INSTAGRAM™ and/or that the mother does not, the probability that the user is the daughter may increase to 85%. In some examples, determining that a specific user frequents a website or uses an application, among other determinations, may be based on satisfying a pre-determined threshold of number of visits, visits per time frame (e.g., hour, day, week, month), the amount of time spent on a webpage and/or application during a time frame (e.g., a time frame of a couple of seconds may be a second user changing the website the first user was last visiting versus a time frame of minutes or hours which may indicate a user is visiting a website or using an application). In other examples, the time at which the website and/or application is accessed may indicate a specific user. For example, the daughter may not have access to a smart device in school or the mother may mother may not have access to this site during, and if a user accesses INSTAGRAM™ on a smart device during what the system believes to be school hours or work hours, then the user is likely not the daughter and not the mother.

Once the electronic device is determined to be in the location, there is a 33% probability that the user could be the father and a 33% probability that the user could be the daughter. The system then determines the electronic device is a smartphone and not a tablet; however, all of the members of the family have a smartphone, and thus the probability that the user is either the father or the daughter may remain constant or in some models and techniques may drop to 25%, respectively. Additional data may be needed to make a stronger probability of identity. The system may then receive information related to the applications being accessed on the smartphone. If the data node 625 is received and indicates the user is accessing the software application INSTAGRAM™, then the probability that the user is the daughter increases to 85%. If the data node 620 is received and indicates the user is accessing a URL directed to ESPN.com then the probability that the user is the father may increase to 85%.

In another example, the system may determine a probability of identification based on known users; however, there may be consideration that the unidentified person may not be an approved user. For example, the system may make a 50% identification determination that a person present is the father or the son, respectively, based on the determination that a male is present. However, in some cases an unexpected person may be present that the system should account for, this reassigning the probabilities to be, for example, 45%/45%/10%, for the father, the son, and the currently unidentified male, respectively. Through additional determinations and/or other actions, these probabilities and/or related determinations or correlations may be adjusted or changed over time or based on additional data.

FIG. 6 is a simplified example to demonstrate how the probability may change, be refined, and be updated as more data is received by the system. In other examples, the system may use artificial intelligence, Bayesian networks, other graph theory models, other probabilistic modeling, and computational algorithms and methods to determine a probability of identification.

Figure 7:
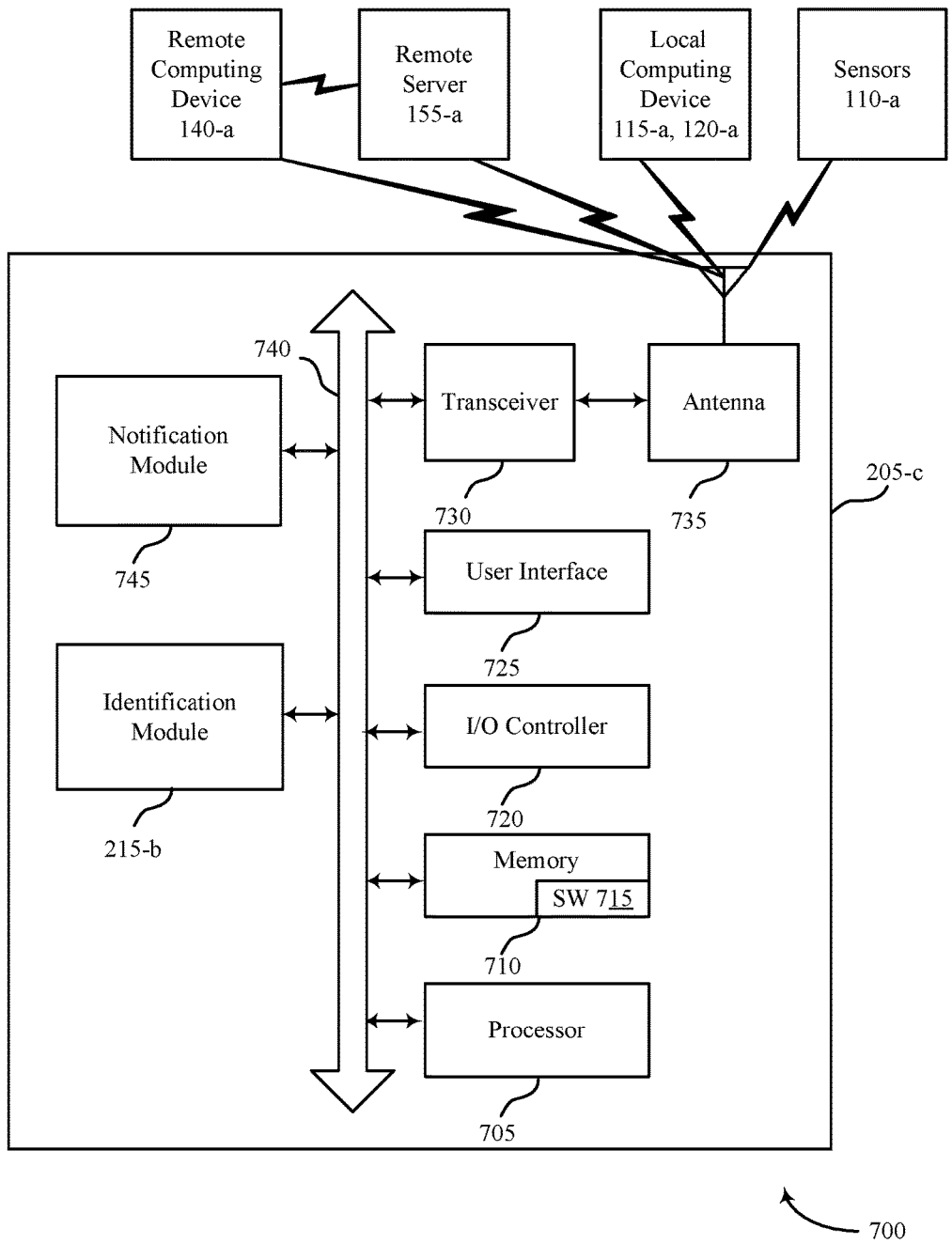
FIG. 7 shows a block diagram of an apparatus relating to a security and/or an automation system, in accordance with various aspects of this disclosure.

FIG. 7 shows a system 700 for use in identification graph theory in accordance at least some examples. System 700 may include an apparatus 205-c, which may be an example of the control panel 135, local computing devices 115 and/or 120, remote computing device 140, and/or one or more sensor units 110 of FIG. 1. Apparatus 205-b may also be an example of one or more aspects of apparatus 205 and/or 205-a and/or 205-b of FIGS. 2-4.

Apparatus 205-c may include an identification module 215-b, which may be an example of the identification modules 215 and/or 215-a described with reference to FIGS. 2 and 3. The identification module 215-b may determine the probability an identified person is accurate based at least in part on the identification and location of at least one person, as described above with reference to FIGS. 2-6.

Apparatus 205-c may also include components for bi-directional voice and data communications including components for transmitting communications and components for receiving communications. For example, apparatus 205-c may communicate bi-directionally with remote computing device 140-a, remote server 155-a, local computing devices 115-a and/or 120-a, and/or sensors 110-a. This bi-directional communication may be direct (e.g., apparatus 205-c communicating directly with sensor unit 110-a) or indirect (e.g., apparatus 205-c communicating with remote computing device 140-a via remote server 155-a). Remote server 155-a, remote computing device 140-a, local computing devices 115-a and 120-b and sensor units 110-a may be examples of remote server 155, remote computing device 140, local computing devices 115 and 120, and sensor units 110 as shown with respect to FIG. 1.

Apparatus 205-c may also include a processor 705, and memory 710 (including software (SW) 715), an input/output controller 720, a user interface 725, a transceiver 730, and one or more antennas 735, each of which may communicate—directly or indirectly—with one another (e.g., via one or more buses 740). The transceiver 730 may communicate bi-directionally—via the one or more antennas 735, wired links, and/or wireless links—with one or more networks or remote devices as described above. For example, the transceiver 730 may communicate bi-directionally with one or more of remote server 155-a or sensor unit 110-a. The transceiver 730 may include a modem to modulate the packets and provide the modulated packets to the one or more antennas 735 for transmission, and to demodulate packets received from the one or more antennas 735. While an apparatus comprising a sensor, local computing device, or control panel (e.g., 205-c) may include a single antenna 735, the apparatus may also have multiple antennas 735 capable of concurrently transmitting or receiving multiple wired and/or wireless transmissions. In some examples, one element of apparatus 205-c (e.g., one or more antennas 735, transceiver 730) may provide a direct connection to a remote server 155-a via a direct network link to the Internet via a POP (point of presence). In some examples, one element of apparatus 205-c (e.g., one or more antennas 735, transceiver 730) may provide a connection using wireless techniques, including digital cellular telephone connection, Cellular Digital Packet Data (CDPD) connection, digital satellite data connection, and/or another connection.

The signals associated with system 700 may include wireless communication signals such as radio frequency, electromagnetics, local area network (LAN), wide area network (WAN), virtual private network (VPN), wireless network (using 802.11, for example), 345 MHz, Z Wave, cellular network (using 3G and/or LTE, for example), and/or other signals. The one or more antennas 835 and/or transceiver module 430 may include or be related to, but are not limited to, WWAN (GSM, CDMA, and WCDMA), WLAN (including Bluetooth and Wi-Fi), WMAN (WiMAX), antennas for mobile communications, antennas for Wireless Personal Area Network (WPAN) applications (including RFID and UWB). In some examples each antenna 735 may receive signals or information specific and/or exclusive to itself. In other examples each antenna 735 may receive signals or information neither specific nor exclusive to itself.

In some examples, the user interface 735 may include an audio device, such as an external speaker system, a visual device such as a camera or video camera, an external display device such as a display screen, and/or an input device (e.g., remote control device interfaced with the user interface 735 directly and/or through I/O controller 720).

One or more buses 740 may allow data communication between one or more elements of apparatus 205-c (e.g., processor 705, memory 710, I/O controller 720, user interface 725).

In addition, apparatus 205-c may comprise notification module 745, which may be a sub-module of identification module 215-b or may be a separate and distinct module. In one embodiment, notification module 745 In one embodiment, notification module 745 may generate and/or transmit a notification and/or send a command to initiate an action based at least in part on probability module 315 determining the probability a person is identified as a specific user.

For example, notification module 745 may send a notification to the mother at work when the notification module 745 receives data indicating the probability that another family member (or a specific family member) detected in the home satisfies a pre-determined threshold. In one example, the threshold may be determined by the system based on algorithms; however, the user may establish thresholds, where the thresholds may vary from person-to-person and/or activity and event (e.g., the threshold for determining identification correctly for turning on the lights may be lower than the threshold for correctly identifying a person that can disable the front door lock). In another example, notification module 745 may send a command to another module of the system to initiate an action, such as adjusting the temperature in the daughter's room to 69 degrees upon determining the daughter has arrived at home.

In some cases, the notification may include a text message, an email, a computer generated phone call and/or a voicemail, and the like. In some cases, notification module 745 may generate a notification in association with an automation/security system. For example, notification module 745 may generate an audio notification such as a chime and/or a computer-generated voice announcement related to a control panel (e.g., apparatus 205-c) and/or using one or more speakers of the automation/security system.

The memory 710 may include random access memory (RAM), read only memory (ROM), flash RAM, and/or other types. The memory 710 may store computer-readable, computer-executable software/firmware code 715 including instructions that, when executed, cause the processor 705 to perform various functions described in this disclosure (e.g., detect identification and/or location data, broadcast audio communications from the remote computing device). Alternatively, the software/firmware code 715 may not be directly executable by the processor 705 but may cause a computer (e.g., when compiled and executed) to perform functions described herein.

In some examples the processor 705 may include, among other things, an intelligent hardware device (e.g., a central processing unit (CPU), a microcontroller, and/or an ASIC). The memory 710 may contain, among other things, the Basic Input-Output system (BIOS) which may control basic hardware and/or software operation such as the interaction with peripheral components or devices. For example, the identification module 215-b may be stored within the system memory 710. Applications resident with system 700 are generally stored on and accessed via a non-transitory computer readable medium, such as a hard disk drive or other storage medium. Additionally, applications may be in the form of electronic signals modulated in accordance with the application and data communication technology when accessed via a network interface (e.g., transceiver 730, one or more antennas 735).

Figure 8:
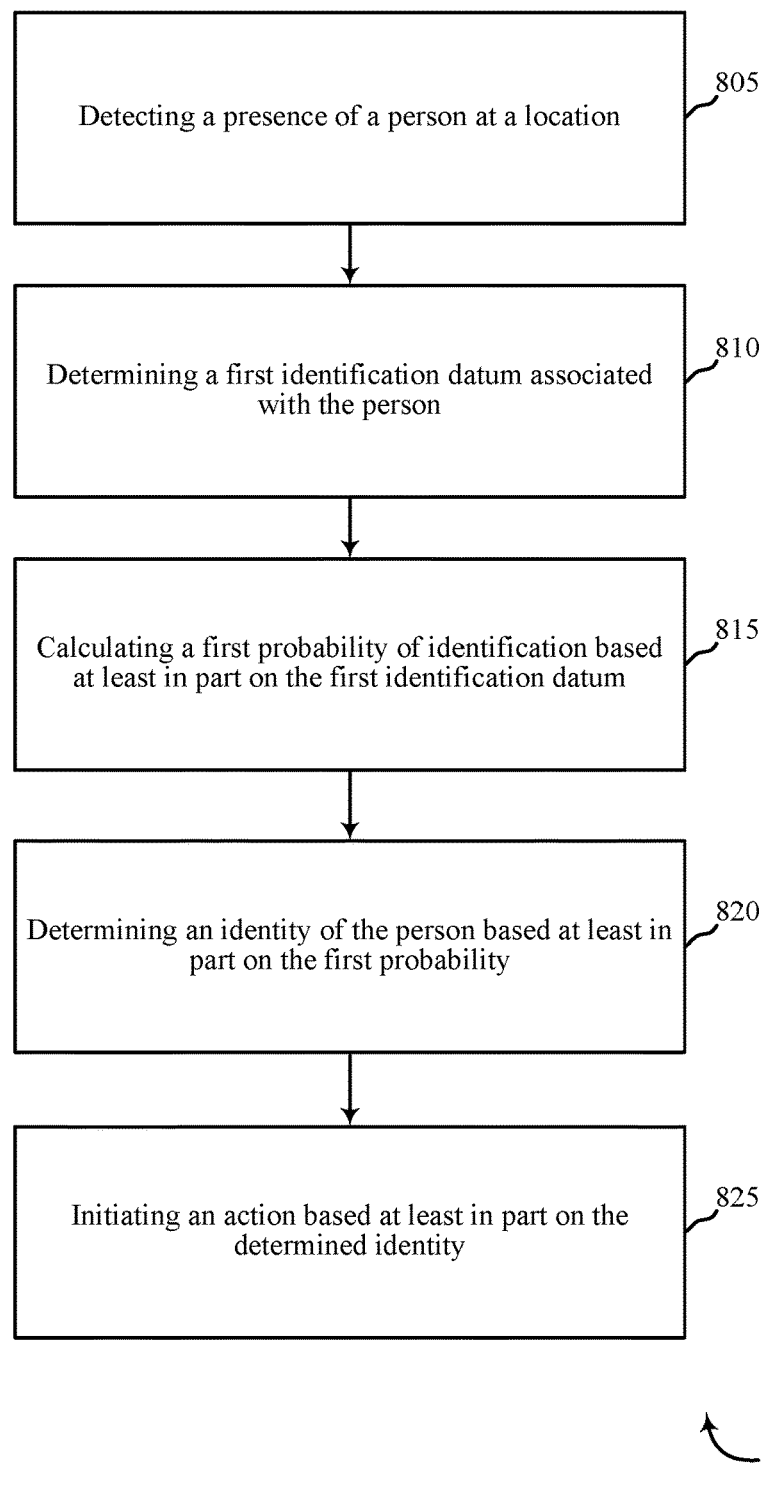
FIG. 8 shows a flow chart illustrating an example of a method relating to a security and/or an automation system, in accordance with various aspects of this disclosure.

FIG. 8 is a flow chart illustrating an example of a method 800 for identification graph theory, in accordance with various aspects of the present disclosure. For clarity, the method 800 is described below with reference to aspects of one or more of the modules and methods described with reference to FIGS. 2-7. In some examples, a control panel, local computing device, and/or sensor may execute one or more sets of codes to control the functional elements described below. Additionally or alternatively, the control panel, local computing device, and/or sensor may perform one or more of the functions described below using special-purpose hardware.

At block 805, the method 800 may include detecting a presence of a person at a location. For example, a person may be detected by way of a sensor detecting motion, sound, vibrations, infrared and/or thermal imaging, etc. At block 810, the method 800 may include determining a first identification datum associated with the person. For example, a first identification datum may be received actively from a user such as a user inputting a personal identification code into a control panel. In other examples, the first identification data may be obtained in an inactive way (e.g. passively), such as by receiving a wireless communication signal from a portable electronic device associated with a user.

At block 815, the method 800 may include calculating a first probability of identification based at least in part on the first identification datum. For example, the identification module 215 may receive data that indicates that the person determined to be in the location is male. The determination may be based on voice biometrics, a facial scan, or other identifying factors. If the household is comprised of two women and two men, the probability module 315 may determine there is a 50% probability that the person is one of the two men based on this data.

At block 820, the method may include determining an identity of the person based at least in part on the first probability. For example, based on the 50% probability the person is one of the two men, the probability module may determine that the person is either the father or the son. At block 825, the method may include initiating an action based at least in part on the determined identity. For example, the system may initiate a command to turn the television to the father's favorite channel based on determining the user is likely the father.

The operations at blocks 805, 810, 815, 820, and 825 may be performed using the receiver module 210 and/or 210-*a* and/or 210-*b*, the identification module 215, and/or the transmitter module 220 and/or 220-*a* and/or 220-*b* and/or the transceiver 730, described with referenced to FIGS. 2-7.

Thus, the method 800 may provide for graph identification theory relating to automation/security systems. It should be noted that the method 800 is just one implementation and that the operations of the method 800 may be rearranged or otherwise modified such that other implementations are possible.

Figure 9:
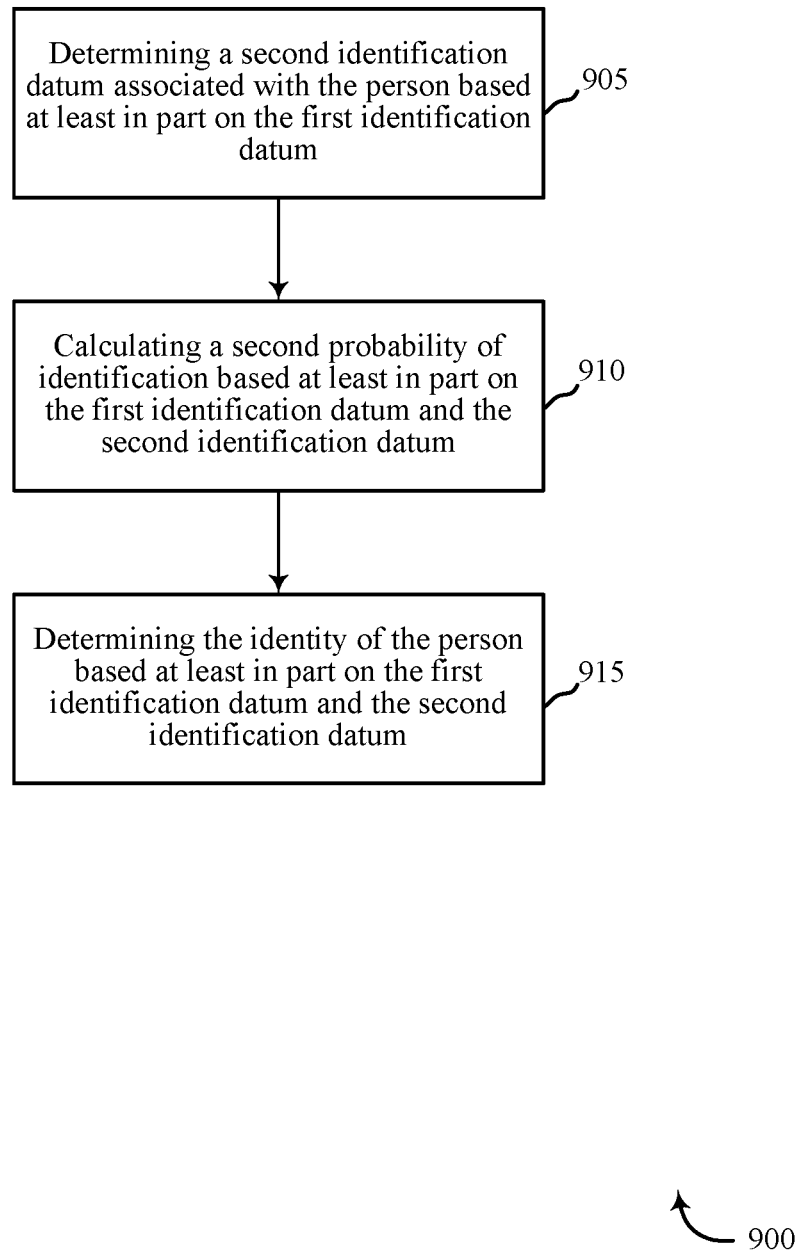
FIG. 9 shows a flow chart illustrating an example of a method relating to a security and/or an automation system, in accordance with various aspects of this disclosure.

FIG. 9 is a flow chart illustrating an example of a method 900 for identification graph theory, in accordance with various aspects of the present disclosure. For clarity, the method 900 is described below with reference to aspects of one or more of the modules and methods described with reference to FIGS. 2-7. In some examples, a control panel, local computing device, and/or sensor may execute one or more sets of codes to control the functional elements described below. Additionally or alternatively, the control panel, local computing device, and/or sensor may perform one or more of the functions described below using special-purpose hardware.

At block 905, method 900 may include determining a second identification datum associated with the person, based at least in part on the first identification datum. For example, in reference to FIG. 8, the system may have determined there is a 50% probability that the person is the father or a 50% probability that the person is the son. However, the system may determine a second identification datum; for example, that the person is under six feet tall. The second identification datum may be considered on the basis that the first probability (i.e., 50% father, 50% son) was not sufficient to determine an identification. In some examples, there may be a pre-determined threshold of probability which may be satisfied before an identification can be made. Thus, with a 50/50 probability, the system may consider a second identification datum (e.g., height). In other examples, the system may consider a second identification datum based on rules which indicate the first identification datum requires a second identification datum to be considered regardless of the probability determined. For example, the system may determine the user is male, and if the system determines the user is male, a second datum is considered to make the identification.

At block 910, method 900 may include calculating a second probability of identification based at least in part on the first identification datum and the second identification datum. For example, based on the fact the person is male and under six feet tall, the system may determine the probability that the person is the son is 75% and the probability the person is the father is 25%.

At block 915, method 900 may include determining the identity of the person based at least in part on the first identification datum and the second identification datum. Based on the probability determined at block 910, the system may then determine that the identity of the person is the son based on the identification data.

The operations at blocks 905, 910, and/or 915 may be performed using the receiver module 210 and/or 210-*a* and/or 210-*b*, the identification module 215, and/or the transmitter module 220 and/or 220-*a* and/or 220-*b* and/or the transceiver 730, described with referenced to FIGS. 2-7.

Thus, the method 900 may provide for graph identification theory relating to automation/security systems. It should be noted that the method 900 is just one implementation and that the operations of the method 900 may be rearranged or otherwise modified such that other implementations are possible.

Figure 10:
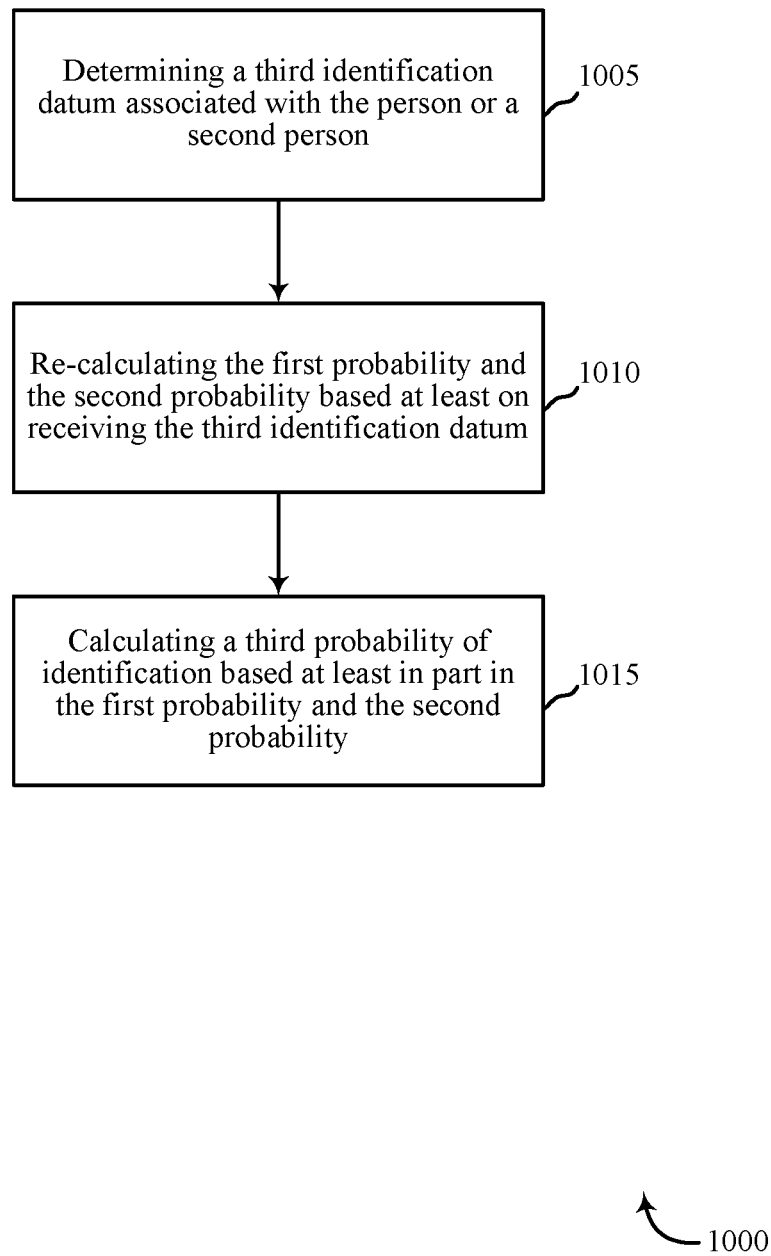
FIG. 10 shows a flow chart illustrating an example of a method relating to a security and/or an automation system, in accordance with various aspects of this disclosure.

FIG. 10 is a flow chart illustrating an example of a method 1000 for identification graph theory, in accordance with various aspects of the present disclosure. For clarity, the method 1000 is described below with reference to aspects of one or more of the modules and methods described with reference to FIGS. 2-7. In some examples, a control panel, local computing device, and/or sensor may execute one or more sets of codes to control the functional elements described below. Additionally or alternatively, the control panel, local computing device, and/or sensor may perform one or more of the functions described below using special-purpose hardware.

At block 1005, method 1000 may include determining a third identification datum associated with the person or a second person. In reference to FIGS. 8 and 9, after determining there is a 75% likelihood the person is the son, the system may receive a third datum; for example, voice biometrics. At block 1010, method 1000 may include re-calculating the first probability and the second probability based at least on receiving the third identification datum. At block 1015, method 1000 may include calculating a third probability of identification based at least in part on the first probability and the second probability. Based on the voice biometrics, the system may re-calculate the probability that the person is the son to 65% because the pitch and tone of the voice more closely matches the stored pitch and tone of the son's voice. Because the probability that the person is the father has dropped to 35% when considering these two re-calculated data elements, a third probability may be calculated which takes into account that there is a 35% probability that given the first two data points, the person is the father.

The operations at blocks 1005, 1010, and/or 1015 may be performed using the receiver module 210 and/or 210-*a* and/or 210-*b*, the identification module 215, and/or the transmitter module 220 and/or 220-*a* and/or 220-*b* and/or the transceiver 730, described with referenced to FIGS. 2-7.

Thus, the method 1000 may provide for graph identification theory relating to automation/security systems. It should be noted that the method 1000 is just one implementation and that the operations of the method 1000 may be rearranged or otherwise modified such that other implementations are possible.

In some examples, aspects from two or more of the methods 800, 900, and 1000 may be combined and/or separated. It should be noted that the methods 800, 900, and 1000 are just example implementations, and that the operations of the methods 800, 900, and 1000 rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some examples, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various examples have been described and/or illustrated here in the context of fully functional computing systems, one or more of these exemplary examples may be distributed as a program product in a variety of forms, regardless of the particular type of computer-readable media used to actually carry out the distribution. The examples disclosed herein may also be implemented using software modules that perform certain tasks. These software modules may include script, batch, or other executable files that may be stored on a computer-readable storage medium or in a computing system. In some examples, these software modules may permit and/or instruct a computing system to perform one or more of the exemplary examples disclosed here.

This description, for purposes of explanation, has been described with reference to specific examples. The illustrative discussions above, however, are not intended to be exhaustive or limit the present systems and methods to the precise forms discussed. Many modifications and variations are possible in view of the above teachings. The examples were chosen and described in order to explain the principles of the present systems and methods and their practical applications, to enable others skilled in the art to utilize the present systems, apparatus, and methods and various examples with various modifications as may be suited to the particular use contemplated.

What is claimed is:

1. A method, comprising: detecting a movement associated with an entity at a location;
    determining whether the entity is a person based at least in part on detecting the movement;
    identifying first identification data associated with the person;
    identifying the person based at least in part on the first identification data associated with the person, wherein identifying the person comprises comparing the first identification data associated with the person to image data stored at a database;
    determining a confidence level of identification of the person after identifying the person;
    identifying second identification data associated with the person based at least in part on determining the confidence level;
    comparing the second identification data with additional data stored at the database based at least in part on identifying the second identification data;
    verifying the identity of the person based at least in part on identifying the second identification data associated with the person; and
    transmitting, to a second person at a second location, a notification comprising identity information of the person based at least in part on determining the confidence level of identification of the person.

2. The method of claim 1, wherein determining whether the entity is a person comprises comparing the detected movement to known movement characteristics of a person.

3. The method of claim 1, further comprising: receiving, from the person, confirmation input regarding the identity information of the person; and transmitting, to the database, the confirmation input regarding the identity information of the person.

4. The method of claim 1, further comprising: calculating a probability of identification of the person based at least in part on the first identification data and the second identification data associated with the person, wherein the notification comprises an indication of the probability of identification of the person.

5. The method of claim 4, wherein the probability of identification of the person is calculated using a decision tree.

6. The method of claim 4, wherein the second identification data comprises biometric information associated with the person.

7. The method of claim 6, wherein the biometric information associated with the person includes fingerprint data, retinal data, height, weight, body shape and size, hair length, hair color, or a combination thereof.

8. The method of claim 1, wherein detecting the movement associated with the entity comprises capturing video of the entity.

9. An apparatus for security and/or automation systems, comprising:
    a processor;
    memory in electronic communication with the processor; and
    instructions stored in the memory, the instructions being executable by the processor to:
    detect a movement associated with an entity at a location;
    determine whether the entity is a person based at least in part on detecting the movement;
    identify first identification data associated with the person;
    identify the person based at least in part on the first identification data associated with the person, wherein identifying the person comprises comparing the first identification data associated with the person to image data stored at a database;
    determine a confidence level of identification of the person after identifying the person;
    identify second identification data associated with the person based at least in part on determining the confidence level;
    compare the second identification data with additional data stored at the database based at least in part on identifying the second identification data;
    verify the identity of the person based at least in part on identifying the second identification data associated with the person; and
    transmit, to a second person at a second location, a notification comprising identity information of the person based at least in part on determining the confidence level of identification of the person.

10. The apparatus of claim 9, wherein determining whether the entity is a person comprises comparing the detected movement to movement characteristics of a person.

11. The apparatus of claim 9, wherein the instructions are executable by the processor to:
- receive, from the person, confirmation input regarding the identity information of the person; and
- transmit, to the database, the confirmation input regarding the identity information of the person.

12. The apparatus of claim 9, wherein the instructions are executable by the processor to:
- calculate a probability of identification of the person based at least in part on the first identification data and the second identification data associated with the person, wherein the notification comprises an indication of the probability of identification of the person.

13. The apparatus of claim 12, wherein the probability of identification of the person is calculated using a decision tree.

14. The apparatus of claim 12, wherein the second identification data comprises biometric information associated with the person.

15. The apparatus of claim 14, wherein the biometric information associated with the person includes fingerprint data, retinal data, height, weight, body shape and size, hair length, hair color, or a combination thereof.

16. A non-transitory computer-readable medium storing computer-executable code, the code executable by a processor to:
- detect a movement associated with an entity at a location;
- determine whether the entity is a person based at least in part on detecting the movement;
- identify first identification data associated with the person;
- identify the person based at least in part on the first identification data associated with the person, wherein identifying the person comprises comparing the first identification data associated with the person to image data stored at a database;
- determine a confidence level of identification of the person after identifying the person;
- identify second identification data associated with the person based at least in part on determining the confidence level;
- compare the second identification data with additional data stored at the database based at least in part on identifying the second identification data;
- verify the identity of the person based at least in part on identifying the second identification data associated with the person; and
- transmit, to a second person at a second location, a notification comprising identity information of the person based at least in part on determining the confidence level of identification of the person.

17. The non-transitory computer-readable medium of claim 16, the code executable by the processor to:
- receive, from the person, confirmation input regarding the identity information of the person; and
- transmit, to the database, the confirmation input regarding the identity information of the person.

18. The non-transitory computer-readable medium of claim 16, the code executable by the processor to:
- calculate a probability of identification of the person based at least in part on the first identification data and the second identification data associated with the person, wherein the notification comprises an indication of the probability of identification of the person.

* * * * *